(12) United States Patent
Marcetic et al.

(10) Patent No.: US 9,231,500 B2
(45) Date of Patent: Jan. 5, 2016

(54) SENSORLESS MOTOR BRAKING SYSTEM

(71) Applicant: Nidec Motor Corporation, St. Louis, MO (US)

(72) Inventors: Darko Marcetic, Novi Sad (RS); Mile Bozic, Barlett, IL (US)

(73) Assignee: Nidec Motor Corporation, St. Louis, MO (US)

( * ) Notice: Subject to any disclaimer, the term of this patent is extended or adjusted under 35 U.S.C. 154(b) by 299 days.

(21) Appl. No.: 13/753,617

(22) Filed: Jan. 30, 2013

(65) Prior Publication Data

US 2014/0210383 A1 Jul. 31, 2014

(51) Int. Cl.
| | |
|---|---|
| H02P 3/00 | (2006.01) |
| H02P 3/08 | (2006.01) |
| H02P 3/18 | (2006.01) |
| H02P 21/00 | (2006.01) |
| H02P 21/14 | (2006.01) |

(52) U.S. Cl.
CPC .. *H02P 3/08* (2013.01); *H02P 3/18* (2013.01); *H02P 21/0092* (2013.01); *H02P 21/146* (2013.01)

(58) Field of Classification Search
CPC ........... H02P 21/141; H02P 3/12; H02P 6/24; B60L 2200/26
USPC ............ 318/727, 400.02, 461, 375, 376, 609, 318/610
See application file for complete search history.

(56) References Cited

U.S. PATENT DOCUMENTS

| | | | | |
|---|---|---|---|---|
| 4,450,393 | A * | 5/1984 | Kohzai et al. | 318/592 |
| 4,914,365 | A * | 4/1990 | Murakami et al. | 318/609 |
| 5,764,017 | A * | 6/1998 | Bauck | 318/610 |
| 6,483,270 | B1 * | 11/2002 | Miyazaki et al. | 318/700 |
| 6,593,719 | B2 * | 7/2003 | Satta et al. | 318/632 |
| 6,781,340 | B2 * | 8/2004 | Tomita | 318/609 |
| 7,183,738 | B2 * | 2/2007 | Ikeda et al. | 318/607 |
| 7,453,175 | B2 | 11/2008 | Nakanishi et al. | |
| 7,498,761 | B2 * | 3/2009 | Iwashita et al. | 318/727 |
| 7,969,138 | B2 | 6/2011 | Sheahan | |

* cited by examiner

*Primary Examiner* — Rina Duda
(74) *Attorney, Agent, or Firm* — Hovey Williams LLP (57) ABSTRACT

An electric motor control system includes a motor control circuit for generating a motor control signal and a braking mechanism for adjusting the motor control signal to augment motor losses when the motor control circuit is in a braking mode. The braking mechanism includes a difference component for receiving a first signal containing motor reference speed information, for receiving a second signal containing actual speed information, and for generating a third signal containing information indicating a difference between the reference speed and the actual speed. An integrating component integrates the third signal and generates a fourth signal representing the integrated third signal. The fourth signal may augment a voltage control signal in a voltage-based control circuit or may augment a flux-producing component of a current control signal in a current-based control circuit. The electric motor control circuit may include multiple braking mechanisms for use in different modes of operation.

7 Claims, 4 Drawing Sheets

SENSORLESS MOTOR BRAKING SYSTEM

FIELD

Embodiments of the present invention relate to systems and methods for braking electric motors.

BACKGROUND

Electric motors commonly include a stationary component called a stator and a rotating component called a rotor. The rotor rotates within (or around) the stator when the motor is energized with a driving waveform. Induction motors, sometimes referred to as asynchronous motors, are a type of electric motor wherein power is supplied to the rotor by means of electromagnetic induction rather than by means of direct electrical connections to the rotor.

As with synchronous motors, the driving waveform supplied to an induction motor's stator creates a magnetic field that rotates in time with the AC oscillations of the driving waveform. The induction motor's rotor rotates at a slower speed than the stator field. This difference in rotational speed, also referred to as "slip," "slip frequency," or "slip speed," results in a changing magnetic flux in the rotor windings that induces currents in the rotor windings. The induced currents in turn generate magnetic fields in the rotor windings that oppose the rotating magnetic field created by the stator, thereby inducing rotational movement in the rotor. The rotor accelerates until the magnitude of induced rotor current and rotor torque balances the applied load. Since rotation at synchronous speed would result in no induced rotor current, an induction motor always operates at less than synchronous speed during normal forward operation.

Rotation of an induction motor may be stopped by simply removing the driving waveform from the motor and allowing the motor to coast to a standstill over time due to the inertia of the rotor and anything coupled to the rotor. Alternatively, rotation of an induction motor may be stopped more quickly using a braking method involving adjusting the frequency of the driving waveform to be less than the rotor frequency, wherein the rotating magnetic field created by the stator induces rotational pressure on the rotor that opposes the rotor's movement and actively reduces motor speed. Using this braking method, the inertia of the rotor and applied load induces voltage in the stator that may energize external motor components, such as a DC bus supplying power to the motor.

In many motor applications, it is desirable to stop rotation of the rotor as soon as the driving waveform is removed from the motor. For example, in washing machine applications, it is desirable to stop rotation of the washing machine motor after a high speed spin cycle so that the washing machine may be unloaded or switched to a slower speed wash or rinse cycle. Unfortunately, the braking method mentioned above suffers from limitations that may render it ineffective to quickly stop heavy loads. The braking pressure created by the driving waveform, for example, is limited by the electric power available to energize the stator. The braking pressure is further limited by the capacity of the motor and other components to handle the voltage induced by the rotor during the braking process.

Accordingly, various alternative techniques have been developed for braking electric motors. One such technique uses brake pads, pulleys, and/or other friction braking systems. Unfortunately, friction brakes add cost and complexity to a motor and are therefore not desirable for low cost applications such as washing machines. Friction brakes also eventually wear out with use and require repair or replacement.

Thus, many motor applications employ alternative electric braking systems rather than friction brakes. One type of electric braking system involves DC injection braking in which a direct current (DC) voltage is applied to a motor's stator windings to brake the rotor. The DC voltage creates a stationary magnetic field which applies a static torque to the rotor. This slows and eventually halts rotation of the rotor. As long as the DC voltage remains on the stator windings, the rotor is held in position and resists rotation. DC injection braking is relatively simple, cost-effective, and maintenance free and is therefore a popular choice of braking for many motor applications; however, it has not been used effectively in some applications as described below.

It is also often desirable to determine when a motor's rotor has stopped rotating so the rotor can be driven in the opposite direction, at a different speed, etcetera. This can be accomplished with a motor shaft sensor such as a Hall effect sensor, but such sensors increase the cost and complexity of motors and are therefore not desirable for many lower cost applications such as washing machine motors.

Thus, sensorless techniques for determining motor speed have been developed. One type of sensorless speed detection employs various algorithms for estimating when a rotor stops based on measured electrical parameters. However, the measured electrical parameters, and thus the results of the algorithms, are less accurate when the motor is being braked with the above-described DC injection braking techniques. Thus, DC injection braking techniques generally require a motor shaft sensor.

The above section provides background information related to the present disclosure which is not necessarily prior art.

SUMMARY

Embodiments of the present invention solve the above described problems by providing improved systems and methods for braking electric motors without the need for motor shaft sensors, regenerative front-end diodes, braking resistors or other costly and/or complex components.

A braking mechanism constructed in accordance with an embodiment of the present invention and configured for use with an electric motor control system utilizes a difference component and an integrating component to generate a motor braking signal to augment braking power. The difference component receives a first signal containing reference motor speed information, a second signal containing actual motor speed information, and generates a third signal containing information indicating a difference between the reference motor speed and the actual motor speed. The integrating component integrates the third signal and generates a fourth signal based on the integrated third signal. The fourth signal is used to augment a motor braking signal generated by, for example, a motor control circuit that is part of the motor control system.

In another embodiment of the invention, a motor control system comprises a power inverter and control circuitry configured to generate a first motor control signal according to a target voltage and to generate a second control signal according to a target current. A first braking mechanism is configured to modify the first control signal to maximize motor losses, and a second braking mechanism is configured to modify the second control signal to maximize motor losses. A controller switches operation of the motor control system between generating the first control signal and the second control signal. The controller may also selectively engage either of the first braking mechanism and the second braking mechanism when the control circuitry is in a braking mode.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

DRAWINGS

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etcetera described in one embodiment may also be included in other embodiments, but is not necessarily included. Thus, the present technology can include a variety of combinations and/or integrations of the embodiments described herein.

Figure 1:
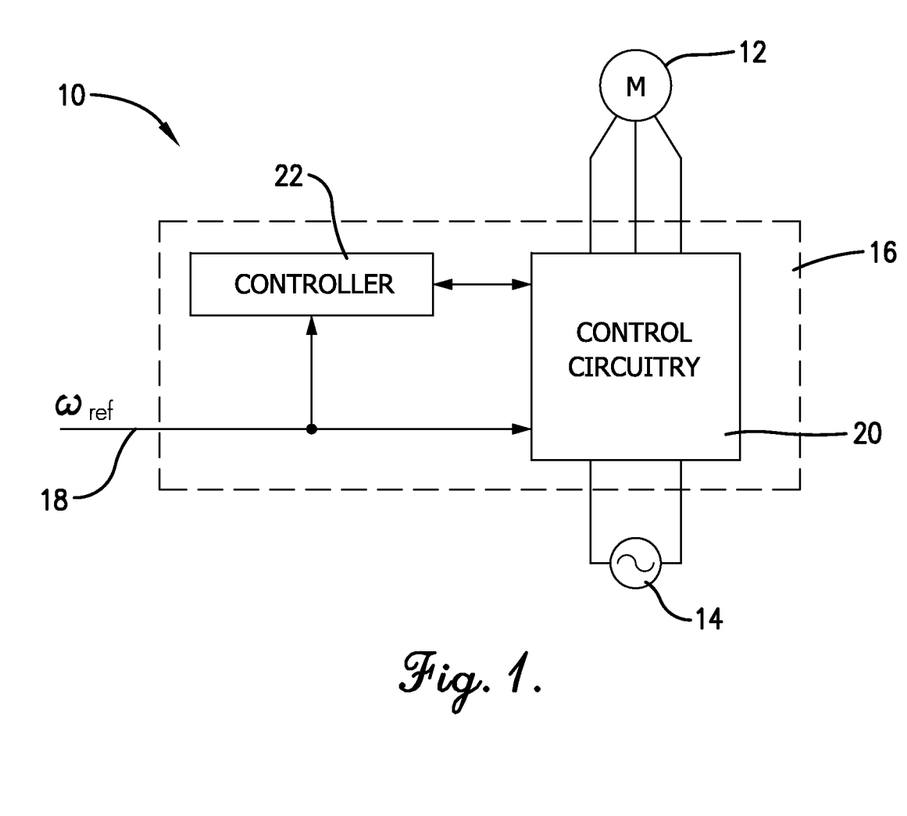
FIG. 1 is a block diagram of a motor system constructed in accordance with embodiments of the invention.

Turning now to the drawing figures, and initially FIG. 1, an electric motor system 10 constructed in accordance with embodiments of the invention is illustrated. The motor system 10 broadly includes an electric motor 12, a power source 14, and a motor control system 16 for receiving power from the power source 14 and generating a driving waveform to power the motor 12 according to a reference motor speed ($\omega_{ref}$) communicated to the control system via a reference speed input 18. The reference motor speed corresponds to a desired or target operating motor output speed and may be generated by an external motor control mechanism (not illustrated) configured to operate the motor 12 according to a particular implementation of the invention. The motor control system 16 includes control circuitry 20 configured to receive input power from the power source 14, receive a reference motor speed signal from the reference speed input 18, create the driving waveform, and communicate the driving waveform to the motor 12. A controller 22 manages certain aspects of the operation of the control circuitry 20, including switching between a voltage-based control mode and a current-based control mode, as explained below.

The power source 14 may be a conventional alternating-current power source, such as a standard 115V or 230V source available in residential and commercial buildings via standard electrical outlets. The motor system 10 may be part of an appliance drive system, such as a washing machine or a clothes dryer, that includes additional electrical and mechanical components not illustrated or described herein.

The motor 12 may be an electric induction motor and, in one exemplary embodiment, is a three-phase, four-pole AC induction motor rated to operate at a maximum voltage of between 190 and 200 volts and a maximum current of between 4 and 6 amps. The motor 12 may be configured to operate within a normal operating range of, for example, between 0 and 3,000 rpm, and may be capable of operating at speeds well beyond the normal operation range, such as up to 17,000 or 18,000 rpm. Motor operation beyond the normal operating range may be characterized by progressively diminishing performance characteristics, such as decreased torque, as explained below.

Figure 4:
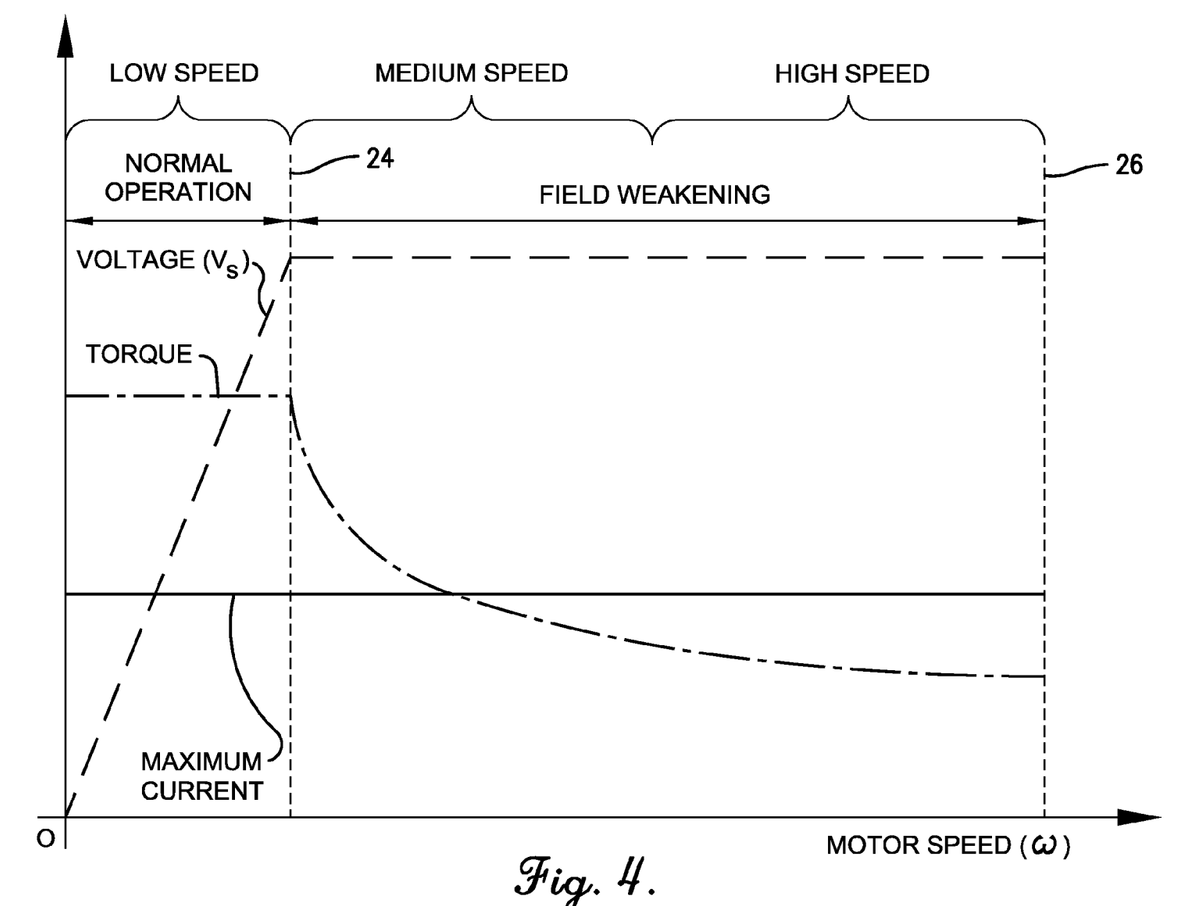
FIG. 4 is a graphical representation of certain operating and performance characteristics of the motor of FIG. 1.

Various operating and performance characteristics of the motor 12, including stator voltage ($V_s$), maximum operating current and output torque, are illustrated in the graph of FIG. 4 across the operating speed range of the motor 12. As shown in FIG. 4, motor performance characteristics differ according to whether the motor is operating in a normal operating region or a field weakening region. The normal operating region corresponds to a motor output speed of zero up to a nominal operating speed 24, which may be, for example, 3,000 or 4,000 rpm. The field weakening operating region corresponds to the nominal speed 24 up to a maximum motor speed 26, which may be, for example, about 17,000 or 18,000 rpm. When operating in the normal operating region, the speed of the motor 12 generally follows a linear pattern and is proportional to the stator voltage ($V_s$), while torque is generally constant. In the field weakening region, the stator voltage remains at or near a maximum operating voltage and the torque diminishes as the motor output speed increases. The maximum operating current is defined by limitations of the motor 12, the control circuitry 20, or both. While the maximum operating current generally remains constant across all motor operating speeds, the motor stator current ($i_s$) will typically fluctuate with changing operational parameters, such as changes in motor speed and load torque. The total stator current ($i_s$) includes a torque producing component ($i_{sq}$) and a flux producing component ($i_{sd}$), whose relationship is defined by the following equation:

$$i_s = \sqrt{(i_{sd})^2 + (i_{sq})^2}$$

For purposes of the present teachings, the motor 12 generally operates in three different output speed ranges including low speed, medium speed and high speed. The low speed range generally corresponds to the normal operating region, the medium speed range generally corresponds to a lower portion of the field weakening region, and the high speed range general corresponds to an upper portion of the field weakening region, as indicated in the graph of FIG. 4. The motor speed corresponding to the boundary between the medium and high speed ranges may be defined as a particular motor speed, such as 8,000 rpm or 10,000 rpm, or as a percentage of a maximum motor speed, such as 50%, 60% or 70% of the maximum speed 26. Alternatively, the boundary may be defined in terms of the stator current, such as a particular value of $i_{sd}$ or $i_{sq}$ or a difference between $i_{sd}$ and $i_{sq}$. Further yet, the boundary between the medium and high speed ranges may be defined in terms of the torque, such as a particular torque value or percentage of maximum torque. The boundary between the medium and high speed ranges is relevant in that may be used by the controller as a threshold speed for switching between the voltage-based control mode and the current-based control mode, as explained below. In some embodiments, the boundary between the medium and high speed ranges is defined as a rotor speed at which the stator voltage amplitude is at or near the inverter voltage margin. When the motor is operating at or near the inverter voltage margin, fluctuations in the inverter voltage margin due to, for example, variations in the DC bus voltage make current-based motor control impractical.

The controller 22 includes digital logic configured to interact with and control certain components of the control circuitry 20. The digital logic may include discrete logic components, programmable logic devices and/or general purpose computer processors such as microcontrollers or microprocessors. In some embodiments of the invention, the controller 22 is or includes a computer processor configured to execute a computer program for directing the control circuitry 20 to operate in either the current-based control mode in the low and medium speed ranges or in the voltage-based control mode in the high speed range.

Thus, aspects of the invention may be implemented with one or more computer programs stored in or on computer-readable media residing in or accessible by the controller 22. The computer program comprises a series of executable instructions for implementing logical functions in the controller 22. The computer program can be embodied in any non-transitory computer-readable medium for use by or in connection with the controller 22 wherein the controller fetches instructions from the computer-readable medium and executes the instructions. As used herein, a "computer-readable medium" can be any non-transitory means that can store the program for use by or in connection with the controller. The computer-readable medium can be, for example, but is not limited to, an electronic, magnetic, optical, electro-magnetic, infrared, or semi-conductor system, apparatus, or device. More specific, although not inclusive, examples of the computer-readable medium would include the following: an electrical connection having one or more wires, a random access memory (RAM), a read-only memory (ROM), and an erasable, programmable, read-only memory (EPROM or Flash memory).

Figure 2:
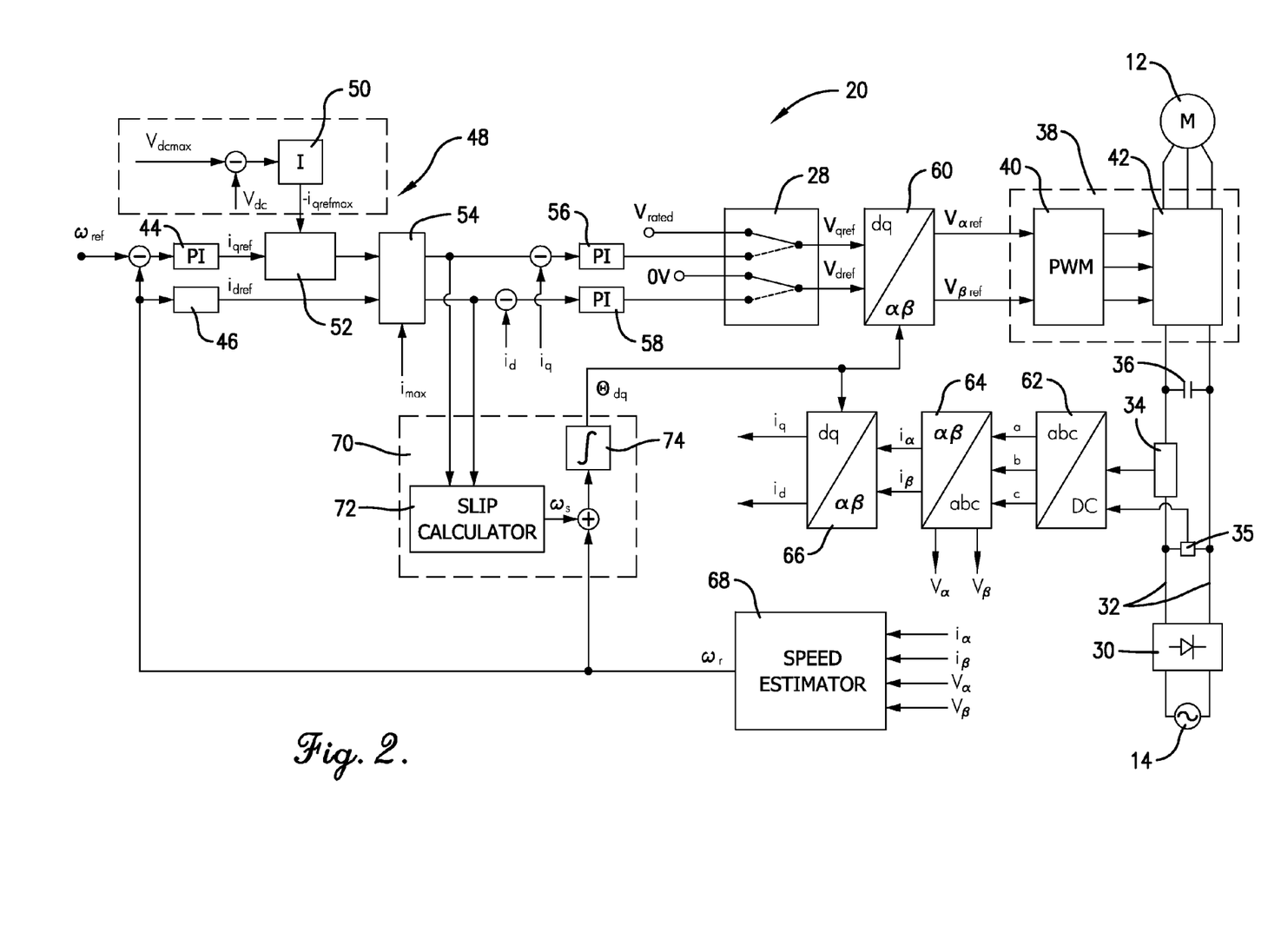
FIG. 2 is a schematic representation of control circuitry for use with the motor system of FIG. 1.

Turning now to FIG. 2, certain components of the control circuitry 20 are illustrated in greater detail. A rectifier 30 converts AC power received from the power source 14 to DC power that energizes a DC bus 32. The rectifier 30 may include virtually any type of rectifier circuit, but in various preferred embodiments is a simple non-regenerative rectifier, such as a diode bridge rectifier. A signal shunt 34 and voltage sensor 35 are coupled with the DC bus 32 and used to detect voltage and/or current levels on the DC bus 32 for use in feedback loops, as explained below in greater detail. The signal shunt 34 may be, for example, a resister, while the voltage sensor 35 may be a voltage divider circuit. One or more capacitors 36 are also coupled to the DC bus 32 to minimize voltage ripple on the bus 32 and to store regenerative energy in the bus 32 during braking.

Inverter circuitry 38 includes pulse width modulation ("PWM") control logic 40 and a three-phase inverter 42 that converts DC power from the DC bus 32 to driving waveforms that are communicated to the motor 12. The PWM control logic 40 receives two input signals ($V_{\alpha ref}$ and $V_{\beta ref}$) representing two-phase stationary reference frame voltage values $V_{\alpha}$ and $V_{\beta}$, and converts the input signals to inverter control signals that drive the inverter to convert power from the DC bus 32 to the driving waveforms applied to the motor stator windings. The voltage magnitude, voltage angle and frequency of the driving electric waveforms are manipulated according to the reference motor speed $\omega_{ref}$ to control operation of the motor 12. When the motor 12 is operating at a constant speed or accelerating, it has a positive slip frequency and generally consumes energy. When the motor 12 is decelerating (braking), it has a negative slip frequency and generates energy that is dissipated in the motor 12 (as rotor and stator losses) and that energizes the inverter 42 and the DC bus 32, thereby increasing the voltage in those components beyond the voltage supplied by the rectifier 30. The increased voltage on the DC bus 32 may contribute to braking by further increasing stator voltages and losses in the motor 12, as explained below in greater detail.

When the switch 28 is in a first position (represented by the broken lines in FIG. 2), the control circuitry 20 operates in the current-based control mode according to principles of indirect field oriented control (IFOC). In the current-based control mode, the control circuitry 20 drives operation of the power inverter 42 according to a target stator current. The IFOC motor control method involves controlling AC motor operation by means of three motor input variables: voltage magnitude, voltage angle and signal frequency. These variables are manipulated according to the reference speed $\omega_{ref}$ via two control/feedback loops that independently control the speed (frequency) and strength of the rotating magnetic field induced in the motor's stator.

The reference motor speed ($\omega_{ref}$) signal is received at the left side of the circuit diagram in FIG. 1. The $\omega_{ref}$ signal may be received from an external motor controller, such as an appliance motor controller configured to control the speed and operation of the motor according to operational parameters of the particular appliance. An estimated rotor speed, $\omega_r$, is subtracted from the reference speed and the difference is communicated to a first proportional-integral controller 44 configured to generate a torque-producing component $i_{qref}$ of a target stator current. The estimated motor speed ($\omega_r$) is also communicated to a field weakening controller 46 configured to generate a flux-producing component $i_{dref}$ of the stator current. The field weakening controller 46 decreases the value of $i_{dref}$ when the reference motor speed is in the field weakening region of motor operation.

The $i_{qref}$ signal is communicated from the first proportional-integral controller 44 to a DC voltage limiter circuit 48 that is configured to limit the maximum negative value of $i_{qref}$ based on the voltage limitations of the motor 12, inverter 42 and/or capacitor 36. The value of $i_{qref}$ is negative during motor braking when the reference motor speed is less than the actual rotor speed. When braking, regenerative energy from the motor 12 increases the voltage in the inverter 42 and the DC bus capacitor 36, as explained above. The voltage limiter circuit 48 prevents the negative value of $i_{qref}$ from exceeding a level corresponding to the maximum voltage of the motor, inverter and/or capacitor. The voltage limiter circuit 48 receives a first signal $V_{dcmax}$ representing a maximum voltage level, a second signal $V_{dc}$ representing an estimated or measured voltage on the DC bus 32, and subtracts the value of $V_{dc}$ from $V_{dcmax}$. An integrator controller 50 integrates the difference and communicates the result, $-i_{qrefmax}$, to a first current limiter component 52 that limits $i_{qref}$ to the value of $-i_{qrefmax}$.

A current limiter component 54 receives both $i_{qref}$ and $i_{dref}$ signals and imposes a limit on the signals corresponding to a maximum stator current as defined by a maximum rating of the motor 12 and/or the inverter 42. Thus, while the voltage limiter circuit 48 imposes a maximum negative value of $i_{qref}$ during braking to regulate regenerative voltage, the current limiter component 54 imposes a maximum positive value of $i_{qref}$ and $i_{dref}$ during normal operation. Measured values of the torque-producing component $i_q$ and the flux-producing component $i_d$ of the actual stator current are subtracted from $i_{qref}$ and $i_{dref}$, and the resulting difference is communicated to second 56 and third 58 proportional-integral controllers which calculate rotating two-phase voltage signals $V_{qref}$ and $V_{dref}$.

An inverse Park conversion circuit 60 converts the $V_{qref}$ and $V_{dref}$ signals to stationary two-phase signals $V_{\alpha ref}$ and $V_{\beta ref}$ which are received by the PWM control logic 40 of the inverter circuitry 38. The PWM control logic 40 generates a plurality of inverter control signals based on the stationary two-phase signals $V_{\alpha ref}$ and $V_{\beta ref}$, as explained above, and communicates the control signals to the inverter 42.

In the current-based control mode, the control circuitry 20 uses feedback loops to generate the motor control signals. The shunt 34 and sensor 35 detect current and/or voltage on the DC bus 32 and communicate the information to a converter component 62 that generates a plurality of signals representing measured values of the instantaneous stator current and/or voltage. A Clarke conversion circuit 64 converts the measured stator current and/or voltage values to two-phase, stationary values $i_\alpha$ and $i_\beta$, which are then converted to two-phase rotating signals $i_q$ and $i_d$ by a Park conversion circuit 66. The $i_q$ and $i_d$ signals are combined with the $i_{qref}$ and $i_{dref}$ signals, as explained above. The Clarke conversion circuit 64 may also generate stationary values two-phase, $V_\alpha$ and $V_\beta$ that are used by a speed estimator 68 to estimate the rotor speed $\omega_r$.

The speed estimator 68 calculates an estimated rotor speed, $\omega_r$, based on characteristics of the power communicated to the stator, such as the estimated values $i_\alpha$, $i_\beta$, $V_\alpha$ and $V_\beta$ generated by the Clarke conversion circuit 64. The speed estimator 68 uses, for example, model reference adaptive system (MRAS) principles of operation. The $\omega_r$ signal is combined with $\omega_{ref}$ to generate $i_{qref}$, as explained above. The $\omega_r$ signal is also used by an output angle calculation circuit 70 to generate an output angle signal $\theta_{dq}$ that is used by the Clarke and inverse Clarke conversion circuits to translate between the stationary and rotating domains.

The output angle calculation circuit 70 includes a slip calculator 72 that determines slip frequency, $\omega_s$, as a function of $i_{qref}$ and $i_{dref}$. Specifically, the slip frequency may be defined using the following equation:

$$\omega_s = \frac{i_{gref}}{i_{dref}} \times k$$

where the value of k depends on the characteristics of the motor 12. The slip frequency is combined with the estimated rotor frequency, $\omega_r$, and that combination is integrated using an integrator 74 to generate the output angle signal $\theta_{dq}$.

As mentioned above, when operating in the current-based control mode the control circuitry 20 uses two independent feedback loops to control the strength and speed of the rotating magnetic field induced in the stator. A first feedback loop controls the strength of the rotating magnetic field and includes the Park 66 and Clarke 64 conversion circuits and the proportional-integral controllers 56, 58. A second feedback loop controls the speed of the rotating magnetic field and includes the Clarke conversion circuit 64, the speed estimator 68, the first proportional-integral controller 44, the field weakening controller 46 and the output angle calculation circuit 70. Thus, there is some overlap between the two feedback loops.

When the switch 28 is in the second position (indicated by solid lines in FIG. 2) the control circuitry 20 operates in the voltage-based control mode and controls the motor 12 by manipulating the voltage and frequency of the driving waveform rather than using the IFOC mode of operation employed in the current-based control mode. In the illustrated embodiment, $V_{dref}$ is set to zero and $V_{qref}$ is set to $V_{rated}$, which may correspond to the maximum operating voltage. The maximum operating voltage will typically be the voltage available on the DC bus 32, but may also be related to the maximum voltage capacity of the inverter 42 and/or the motor 12.

In the voltage-based control mode, the control circuitry 20 operates the inverter 42 according to a target voltage ($V_{rated}$) rather than a target current. This mode of operation may be desirable, for example, where the motor 12 is operating at very high speeds and stator voltage is at or near the maximum voltage. In such situations, the voltage-based control mode allows greater power to be delivered to the motor 12 because the voltage margins associated the current-based control mode are eliminated.

Figure 3:
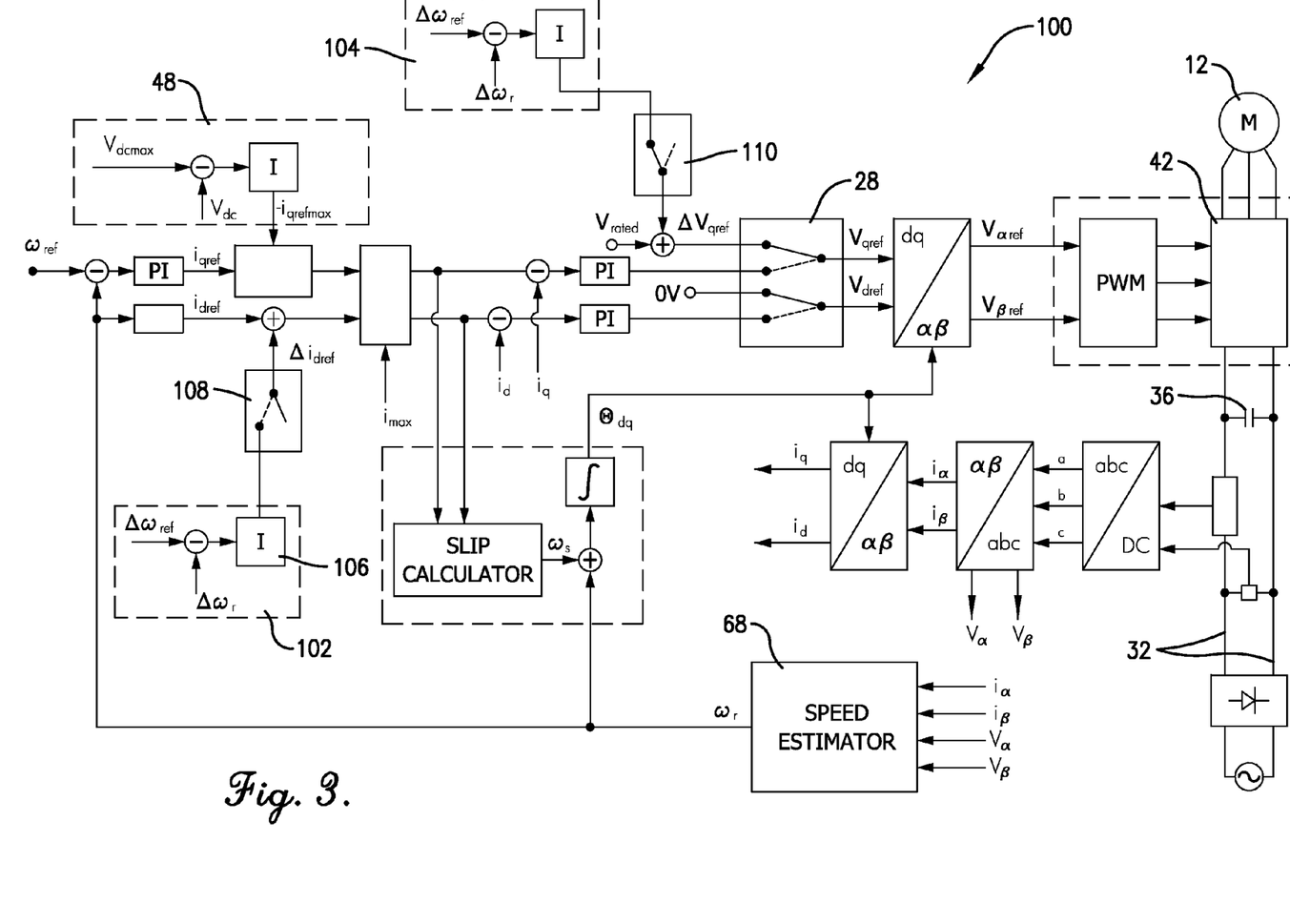
FIG. 3 is a schematic representation of an alternative embodiment of the control circuitry of FIG. 2.

Control circuitry 100 constructed according to another embodiment of the invention is illustrated in FIG. 3. The control circuitry 100 is identical to the control circuitry 20 illustrated in FIG. 2 and described above, except that the control circuitry 100 includes brake mechanisms for regulating the braking power of the motor 12 when the control circuitry 100 is operating in either the current-based control mode or in the voltage-based control mode. Therefore, for convenience similar components are assigned the same reference numerals and only the differences between the two embodiments will be discussed. Particularly, a current-based braking mechanism 102 is used when the circuitry 100 is operating in the current-based control mode and a voltage-based braking mechanism 104 is used when the circuitry 100 is operating in the voltage-based control mode.

The current-based brake mechanism 102 determines a difference between a change in the reference speed ($\Delta\omega_{ref}$) and a change in the estimated rotor speed ($\Delta\omega_r$). That difference is integrated using an integrator controller 106 to generate a differential speed signal $\Delta i_{dref}$ that is combined with the $i_{dref}$ signal when braking in the current-based control mode. Thus, the current-based braking mechanism 102 augments the $i_{dref}$ signal according to a difference between the reference motor speed $\omega_{ref}$ and the estimated rotor speed $\omega_r$ thereby increasing motor losses and causing the motor to slow at a quicker rate. As the difference between the reference motor speed and the estimated motor speed increases, so does the value of $\Delta i_{dref}$ and $i_{dref}$.

A first braking switch 108 is operable to selectively connect the output of the current-based braking mechanism 102 to the $i_{dref}$ signal combination point. The controller 22 may be configured to actuate the switch 108 to connect the current-based braking mechanism 102 to the $i_{dref}$ signal combination point when the motor is in braking mode (i.e., when $\omega_{ref}$ is less than $\omega_r$).

The voltage-based braking mechanism 104 augments the $V_{rated}$ input to increase motor losses during braking when the control circuitry 20 is operating in the voltage-based control mode. The voltage-based braking mechanism 104 is similar in form and function to the current-based braking mechanism 102, described above, such that the braking signal increases with a difference between the reference speed and the estimated rotor speed. Augmenting the $V_{rated}$ input causes the voltage applied to the motor to increase as well, thus increasing motor losses during braking and causing the motor to slow at a quicker rate. Increasing the voltage applied to the motor also increases the level of energy generated in the inverter and on the DC bus by the motor, which in turn increases the amount of voltage available to be applied to the motor, further increasing motor losses and braking power.

A second braking switch 110 is operable to selectively connect the output of the voltage-based braking mechanism 104 to the $V_{rated}$ signal combination point. The controller 22 may be configured to actuate the switch 110 to connect the voltage-based braking mechanism 104 to the $V_{rated}$ signal combination point when the motor is in braking mode (i.e., when $\omega_{ref}$ is less than $\omega_r$).

As explained above, the amount of energy generated in the inverter 42 and the DC bus 32 by the motor 12 during braking will generally be limited by the rated capacity of the motor 12, the inverter 42 and/or the capacitor 36. When braking in either the voltage-based control mode or the current-based control mode, voltage generated on the DC bus 32 by the motor 12 is limited by the voltage limiting circuit 48. In the current-based control mode, the voltage limiting circuit 48 regulates both $i_{qref}$ and the motor slip frequency to limit energy generation in the inverter 42 and on the DC bus 32 and thus avoid damage to those components. In the voltage-based control mode, the voltage limiting circuit 48 regulates only the slip frequency.

It will be appreciated by those skilled in the art that the braking mechanisms 102, 104 provide enhanced braking without compromising control of the braking process. The speed of the motor 12, for example, is tracked by the speed estimator 68 such that braking is enabled to decrease motor speed to any speed, including speeds other than zero. It may be desirable, for example, to slow the motor speed from 5,000 rpm to 3,000 rpm.

In operation, the controller 22 actuates the circuit control switch 28 to shift operation of the control circuit between the voltage-based control mode and the current-based control mode. The controller 22 further actuates the first brake switch 108 and the second brake switch 110 to use the brake mechanisms 102, 104 when in braking mode. Operation of the motor system 10 typically begins when the actual speed of the motor is zero and some non-zero reference speed is applied to the motor control system 16. The controller 22 actuates the circuit control switch 28 such that the switch 28 is in the first position to place the control circuitry in the current-based control mode. The control circuitry 20 generates a driving waveform causing the motor speed to gradually increase toward the motor reference speed. As the motor speed increases through the normal operating region, the stator voltage increases linearly with the speed of the motor 12, as illustrated in FIG. 4. If the reference motor speed $\omega_{ref}$ is in the normal operating region, the actual motor speed reaches the reference speed and stabilizes, and the control circuit 20 continues to drive the motor 12 at the reference speed in the current-based control mode.

If the reference motor speed $\omega_{ref}$ is in the medium speed range, the control circuitry 20 causes the motor speed to increase such that the stator voltage increases to and remains near the maximum available voltage as the actual motor speed reaches the nominal operating speed threshold. The motor speed continues to increase in the field weakening region as the torque-producing component of the stator current increases, the flux-producing component of the stator current decreases, and the motor torque decreases. The actual motor speed eventually reaches the reference speed and stabilizes, and the control circuit 20 continues to drive the motor 12 at the reference speed in the current-based control mode.

If the reference speed is in the high speed range of FIG. 1, the controller 22 continues to increase the motor speed in the current-based control mode until the estimated motor speed $\omega_r$ reaches the high speed range, wherein the controller 22 drives the switch 28 from the first position to the second position, shifting the control circuitry 20 from the current-based control mode to the voltage-based control mode. In the voltage-based control mode, the control circuitry 20 operates the motor 12 at the maximum rated voltage, as explained above. As long as the reference motor speed remains in the high speed range, the control circuitry 20 continues to operate in the voltage-based control mode.

While the motor 12 is operating in the high speed range, if the reference motor speed decreases the control circuitry 20 adjusts $i_{qref}$ and $i_{dref}$ causing the motor to operate at a negative slip frequency until $\omega_r$ decreases to correspond to $\omega_{ref}$. Operating at a negative slip frequency uses the driving waveform against the motor's movement and therefore acts as a brake. In this braking mode, the motor's movement generates electrical energy that may drive up the voltage in the inverter 42 and/or the DC bus 32. If the voltage in the inverter 42 and/or the DC bus 32 approaches the maximum voltage $V_{dcmax}$, the voltage limiting circuit 48 responds by limiting the negative slip frequency to thereby limit the $V_{dc}$ value and prevent damaging overvoltage.

If the control circuitry 20 includes the voltage-based braking mechanism 104, as soon as the reference motor speed decreases to a level below the estimated speed $\omega_r$, the controller 22 drives the second brake switch 110 to combine the voltage value $V_{rated}$ with $V_{qref}$ and thereby increase braking power. When the actual motor speed approaches or reaches the reference motor speed, the controller 22 drives the second brake switch 110 to disengage the braking mechanism 104 from the control circuitry 20.

As long as the reference speed is within the high speed range, the control circuitry 20 continues to operate in the voltage-based control mode. If the reference speed decreases from the high speed range to the middle or low speed range, however, the controller 22 switches operation of the control circuitry 20 from the voltage-based control mode to the current-based control mode by driving the switch 28 from the second position to the first position. If the motor system 10 brakes while in the current-based control mode, the controller 22 drives the first brake switch 108 to engage the current-based braking mechanism 102 as explained above, thereby augmenting the $i_{dref}$ signal and increasing braking power.

The advantages of the present invention will be apparent to those skilled in the art. The design of the motor system 10 minimizes costs in that it does not require the use of a braking resistor, a regenerative front-end diode bridge, or motor shaft speed sensors. The system 10 operates at maximum efficiency by operating according to a target current at lower speeds where the current margin governs operation, and operating according to a target voltage at higher speeds where the voltage margin governs operation. Furthermore, the motor system 10 includes an enhanced braking system that can quickly brake the motor to any speed without losing the ability to measure the motor's speed.

Although the invention has been described with reference to the preferred embodiment illustrated in the attached drawing figures, it is noted that equivalents may be employed and substitutions made herein without departing from the scope of the invention as recited in the claims. The motor control system may be powered by a direct current source, for example, rather than the alternating current source as illustrated, wherein the rectifier may be omitted. Furthermore, the stator current and voltage values used in the control loops may be derived directly from motor input conductors rather than from the DC bus.

Having thus described the preferred embodiment of the invention, what is claimed as new and desired to be protected by Letters Patent includes the following:

1. A braking mechanism for use with an electric motor control system, the braking mechanism comprising:
    a difference component for receiving a first signal corresponding to a change in a reference motor speed over time, for receiving a second signal corresponding to a change in an actual motor speed over time, and for generating a third signal containing information indicating a difference between the change in reference motor speed and the change in actual motor speed; and
    an integrating component for integrating the third signal and generating a fourth signal based on the integrated third signal.

2. The braking mechanism of claim 1, the integrating component being an integral controller.

3. The braking mechanism of claim 1, further comprising a switch for selectively engaging the integrating component.

4. A control system for an electric motor, the system comprising:
    a motor control circuit for generating a motor control signal, the motor control circuit configured to generate a motor driving waveform according to a target current;
    a braking mechanism for adjusting the motor control signal to augment motor losses when the motor control circuit is operating in a braking mode, the braking mechanism including—a difference component for receiving a first signal containing motor reference speed information, for receiving a second signal containing actual speed information, and for generating a third signal containing information indicating a difference between the reference speed and the actual speed, the braking mechanism configured to augment a flux producing component of the target current when the motor control circuit is operating in the braking mode; and
    an integrating component for integrating the third signal and for generating a fourth signal representing the integrated third signal.

5. The control system of claim 4, the motor control circuit configured to generate a motor driving waveform according to a target voltage.

6. The control system of claim 5, the braking mechanism configured to augment the target voltage when the motor control circuit is operating in the braking mode.

7. The control system of claim 4, further comprising a regulator for limiting an amount of voltage induced by the motor during braking by regulating a slip frequency of the motor.

* * * * *